United States Patent Office 3,660,522
Patented May 2, 1972

3,660,522
MODIFIED HIGH MOLECULAR WEIGHT POLY-
AMIDES WITH HIGH AFFINITY FOR ACID
DYES
Joachim Schneider, Krefeld-Uerdingen, Karl-Heinz Hermann and Hans Rudolph, Krefeld-Bockum, and Gunter Nawrath, Dormagen, Germany, assignors to Farbenfabriken Bayer Aktiengesellschaft, Leverkusen, Germany
No Drawing. Filed Jan. 28, 1970, Ser. No. 6,582
Claims priority, application Germany, Feb. 1, 1969,
P 19 05 099.8
Int. Cl. C08g 20/38
U.S. Cl. 260—78 L          1 Claim

ABSTRACT OF THE DISCLOSURE

Modified high-molecular weight polyamides having chemically incorporated therein 0.01 to 10% by weight of an oxazolidine of the general formula

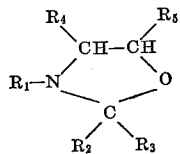

wherein $R_1$ represents a $C_1$ to $C_{20}$ aliphatic radical selected from the group consisting of an unsubstituted radical and a substituted radical containing functional groups inert to polyamides, a cycloaliphatic or a benzyl radical, $R_2$ and $R_3$, which may be different or not, each represents hydrogen or a $C_1$ to $C_{20}$ radical selected from the group consisting of an aliphatic, cycloaliphatic, aromatic, araliphatic, substituted aliphatic, substituted cycloaliphatic, substituted aromatic and substituted araliphatic radical, said substituted radicals containing functional groups inert to polyamides, or $R_2$ and $R_3$, together with the carbon atom to which they are attached, form a carbocyclic or heterocyclic ring, and $R_4$ and $R_5$, which may be different or not, each represents hydrogen or a methyl, ethyl or a phenyl radical; are provided which polyamides show an improved affinity for acid dyes.

This invention relates to modified high molecular weight polyamides with an improved affinity for acid dyes, and to a process for their production.

It is known that the receptivity of polyamides to acid dyes can be improved by adding free amines, for example aliphatic monoamines or diamines or heterocyclic amines, to the polyamide-forming starting materials before polycondensation and thereby producing a larger number of terminal amino groups.

Unfortunately, polyamides obtained by this process contain a theoretical maximum of only two terminal amino groups per macromolecule, and even this theoretical value cannot be approached in practice. In addition, the maximum percentage component of terminal amino groups, and hence the affinity for acid dyes, decreases with increasing molecular weight of the polyamide.

It is also known that organic phosphorus compounds, for example alkyl or aryl phosphinic acids or phosphoric or phosphonic acid esters, preferably in combination with diamines, can be added to polyamides before or during polycondensation. Unfortunately, some of these additives act as chain terminators, so that the quantity in which they are added is limited by the required molecular weight of the polyamide. In addition, they are washed out again to some extent during extraction of the polyamide as is necessary in the production of, for example, polycaprolactam in order to remove low molecular weight components. Another disadvantage of this process lies in the uncontrollable post-condensation of the polyamides during spinning, caused by catalytic quantities of a phosphorus compound, which can lead to considerable difficulties in the production of polyamide fibres.

It is also known that equivalent quantities of an aliphatic or aromatic dicarboxylic acid and of an aliphatic diamine with one or more secondary or tertiary amino nitrogen atoms in the chain can be added to the polyamide-forming starting materials before polymerisation. Although it is possible by an addition such as this considerably to improve the affinity of the polyamides for acid dyes, the physical properties of the polyamides, for example their melting points and water absorption, are simultaneously changed because of the copolyamide formation promoted by the addition.

In addition, the secondary or tertiary amino nitrogen atoms in the polymer chain represent weak spots and promote degradation of the polyamide under the effect of heat or oxidation.

It is an object of this invention to provide polyamides which do not show the disadvantages outlined above.

This object is accomplished by a modified high molecular weight polyamide consisting of a polyamide having recurring carbonamide groups in the chain and having attached thereto in chemically bound form of from 0.01 to 10% by weight, based on the polyamide, of an oxazolidine of the general formula

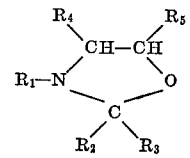

wherein $R_1$ represents a $C_1$ to $C_{20}$ aliphatic radical selected from the group consisting of an unsubstituted radical and a substituted radical containing functional groups inert to polyamides, a cycloaliphatic or a benzyl radical, $R_2$ and $R_3$, which may be different or not, each represents hydrogen or a $C_1$ to $C_{20}$ radical selected from the group consisting of an aliphatic, cycloaliphatic, aromatic, araliphatic, substituted aliphatic, substituted cycloaliphatic, substituted aromatic and substituted araliphatic radical, said substituted radicals containing functional groups inert to polyamides, or $R_2$ and $R_3$, together with the carbon atom to which they are attached, form a carbocyclic or heterocyclic ring, and $R_4$ and $R_5$, which may be different or not, each represents hydrogen or a methyl, ethyl or a phenyl radical.

It is another object of this invention to provide a process for the production of modified high molecular weight polyamides which comprises mixing 0.01 to 10% by weight, based on the polyamide, of an oxazolidine of the general formula

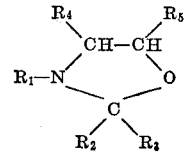

wherein $R_1$ represents a $C_1$ to $C_{20}$ aliphatic radical selected from the group consisting of an unsubstituted radical and a substituted radical containing functional groups inert to polyamides, a cycloaliphatic or a benzyl radical, $R_2$ and $R_3$, which may be different or not, each represents hydrogen or a $C_1$ to $C_{20}$ radical selected from the group consisting of an aliphatic, cycloaliphatic, aromatic, araliphatic, substituted aliphatic, substituted cycloaliphatic, substituted aromatic and substituted araliphatic radical, said substituted radicals containing functional groups inert to polyamides, or $R_2$ and $R_3$, together with the carbon atom to which they are attached, form a carbocyclic or heterocyclic ring, and $R_4$ and $R_5$, which may be different or not, each represents hydrogen or a methyl, ethyl or a phenyl radical, with a polyamide material and reacting said oxazolidine with the polyamide at a temperature above the melting point of the polyamide.

Polyamide materials in the context of this invention are polyamides and polyamide forming starting materials.

The hydroxyl group, the dialkylamino group or a heterocyclic radical, such as the morpholyl radical, are examples of functional groups that are inert to polyamides.

One major advantage of these modified polyamides is that the oxazolidines added cannot be removed by washing with water because they are present in chemically bound form.

For example, the modified polyamides may contain the following oxazolidines in chemically bound form:

3-methyl-oxazolidine;
3-ethyl-oxazolidine;
3-cyclohexyl-oxazolidine;
3-n-butyl-oxazolidine;
3-isobutyl-oxazolidine;
3-n-dodecyl-oxazolidine;
3,5-dimethyl-oxazolidine;
3-cyclohexyl-5-methyl-oxazolidine;
3-n-dodecyl-5-methyl-oxazolidine;
3-methyl-5-ethyl-oxazolidine;
3-cyclohexyl-5-ethyl-oxazolidine;
3-n-dodecyl-5-ethyl-oxazolidine;
3-methyl-5-phenyl-oxazolidine;
3-cyclohexyl-5-phenyl-oxazolidine;
3-benzyl-oxazolidine;
3-methyl-2-propyl-oxazolidine;
3-cyclohexyl-2-propyl-oxazolidine;
2,3-dimethyl-2-ethyl-oxazolidine;
3-cyclohexyl-2-diethyl-oxazolidine;
3-cyclohexyl-2-propyl-5-methyl-oxazolidine;
3-methyl-2-diethyl-5-methyl-oxazolidine;
3-ethyl-2-(spiro-cyclopentane)-oxazolidine;
3-cyclohexyl-2-(spiro-cyclohexane)-oxazolidine;
3-cyclohexyl-5-methyl-2-(spiro-cyclohexane)-oxazolidine;
3-cyclohexyl-5-phenyl-2-(spiro-cyclohexane)-oxazolidine;
3-methyl-2-benzyl-oxazolidine;
3-methyl-2-phenyl-oxazolidine;
3-(2-hydroxy-1-ethyl)-oxazolidine;
3-(2-hydroxy-1-propyl)-5-methyl-oxazolidine;
3-(2-hydroxy-1-ethyl)-2-(spiro-cyclopentane)-oxazolidine;
3-(2-hydroxy-1-ethyl)-2-(spiro-cyclohexane)-oxazolidine;
3-(3-dimethylamino-1-propyl)-oxazolidine;
3-(3-morpholyl-1-propyl)-2-(spiro-cyclopentane)-oxazolidine; and
3-methyl-2-(spiro-cyclohexane)-oxazolidine.

It is preferred to use oxazolidines in which $R_1$ represents an aliphatic or cycloaliphatic radical with from 1 to 6 carbon atoms.

The oxazolidines are present in the modified polyamides in a quantity of from 0.01 to 10% by weight, and preferably in a quantity of from 0.1 to 5% by weight, based on the polyamide.

The modified polyamides according to the invention can be obtained, for example, by adding the oxazolidines to the polyamide-forming starting materials before polymerisation or polycondensation, and then completing polymerisation in known manner, either continuously or in batches. However, it is preferred to mix the oxazolidines with the polyamide melt either during or after polymerisation or polycondensation and to react them with the polyamide at temperatures above the melting point of the polyamide, using conventional mixing machines such as extruders, kneaders and stirrers. Since the oxazolidines are usually liquids, they are particularly suitable for continuous introduction in a continuous-cycle polymerisation process carried out, for example, in a so-called VK-tube.

Polyamides in the context of this invention are those which contain recurring carbonamide groups in the chain and which are formed by polymerising or polycondensing aminocarboxylic acids or their lactams, or diamines and dicarboxylic acids.

The modified polyamides according to the invention may also contain the usual additives such as pigments, dyes, light stabilisers, heat stabilisers and weather stabilisers, optical brighteners, antistatic agents, lubricants and mould-release agents, plasticisers or crystallisation promoters.

Compared with conventional polyamides, the modified polyamides according to the invention have a larger basic group content for the same molecular weight of the polyamide and hence show an increased affinity for acid dyes. They are eminently suitable, inter alia, for the production of yarns, fibres, silk and films which are dyed with acid dyes either subsequently or after further processing, for example into woven fabrics.

The following examples are to further illustrate the invention without limiting it.

EXAMPLE 1

A polycaprolactam melt obtained by continuously polymerising ε-caprolactam in a conventional VK-tube is mixed with an oxazolidine by means of a stirrer. The polycaprolactam melt has a temperature of around 265° C. After mixing, the melt is spun through spinerets into a water bath to form filaments approximately 3 mm. in diameter.

The filaments are granulated by means of a conventional strand granulator, and the granulate is freed from monomeric components by extraction with boiling water and then dried.

The different polyamide samples are tested to determine the following properties:

(1) The relative viscosity of a 1% by weight solution in m-cresol at 25° C., as measured by means of an Ubbelohde viscosimeter.

(2) The basic nitrogen content, as determined by colorimetric titration of a solution in a mixture of phenol and methanol with perchloric acid.

The test results are set out in Table I.

It was found that the basic nitrogen content of the polycaprolactam, and hence its affinity for acid dyes, can be increased by from 2 to 4 times and, if desired, to an even greater extent by the addition of oxazolidines without any decrease in its relative viscosity.

TABLE I

| No. | Oxazolidine | Percent* | Relative viscosity | Basic nitrogen content, percent |
|---|---|---|---|---|
| 1 | 3-cyclohexyl-2-(spiro-cyclohexane)-oxazolidine | 2.4 | 2.71 | 0.11 |
| 2 | do | 3.6 | 2.72 | 0.22 |
| 3 | 3-cyclohexyl-2-phenyl oxazolidine | 3.5 | 2.70 | 0.16 |
| 4 | 3-cyclohexyl-oxazolidine | 1.6 | 2.69 | 0.10 |
| 5 | 3-methyl-2-diethyl-5-methyl-oxazolidine | 2.5 | 2.73 | 0.15 |
| 6 | | | 2.68 | 0.05 |

*Based on polyamide.

What we claim is:

1. A modified high molecular weight polycaprolactam consisting of polycaprolactam having recurring carbonamide groups in the polymeric chain and having recurring units resulting from the chemical reaction of said polycaprolactam at a temperature above the melting point of the polycaprolactam with from 0.01 to 10% by weight, based on the polycaprolactam, of an oxazolidine of the general formula

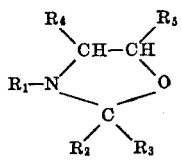

wherein $R_1$ represents a $C_1$ to $C_{20}$ saturated aliphatic hydrocarbon radical selected from the group consisting of an unsubstituted radical and a substituted radical containing functional groups inert to polyamides, a saturated cycloaliphatic hydrocarbon or a benzyl radical, $R_2$ and $R_3$, which may be different or not, each represents hydrogen or a $C_1$ to $C_{20}$ radical selected from the group consisting of saturated aliphatic hydrocarbon, saturated cycloaliphatic hydrocarbon, aromatic hydrocarbon, araliphatic hydrocarbon, substituted saturated aliphatic hydrocarbon, substituted saturated cycloaliphatic hydrocarbon, substituted aromatic hydrocarbon and substituted araliphatic hydrocarbon radical, said substituted radicals containing functional groups inert to polyamides, or $R_2$ and $R_3$, together with the carbon atom to which they are attached, form a carbocyclic ring, and $R_4$ and $R_5$, which may be different or not, each represents hydrogen or a methyl, ethyl or a phenyl radical.

References Cited

UNITED STATES PATENTS 3,216,977   11/1965   Brouns _____ 260—78 L

HAROLD D. ANDERSON, Primary Examiner

U.S. Cl. X.R.

8—57; 57—140 R; 260—33.4 R, 78 R, 78 SC